Dec. 3, 1929.  W. S. GRAHAM  1,737,880
GANG PLOW
Filed Sept. 27, 1928   2 Sheets-Sheet 1
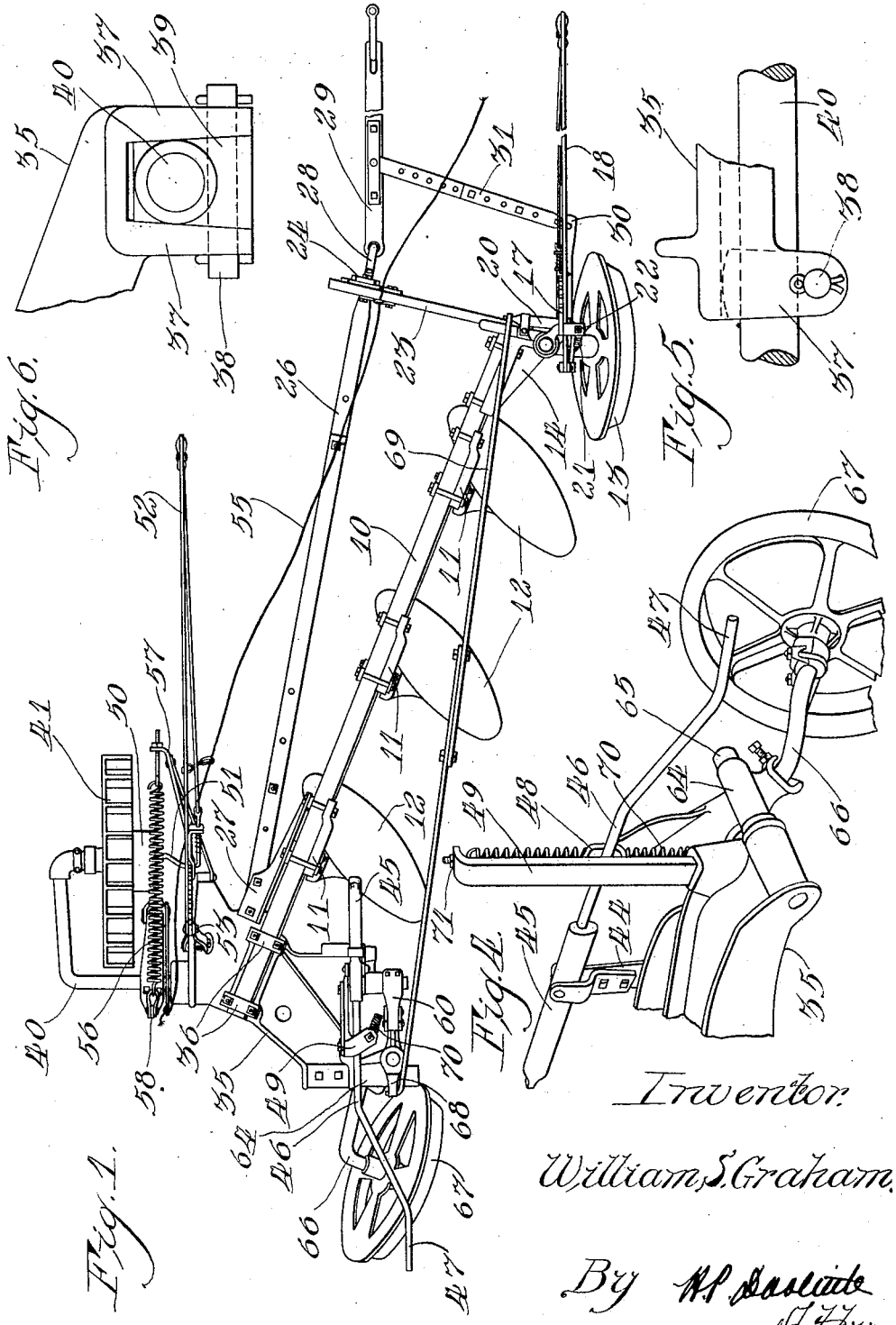
Inventor
William S. Graham
By [signature]
Atty.

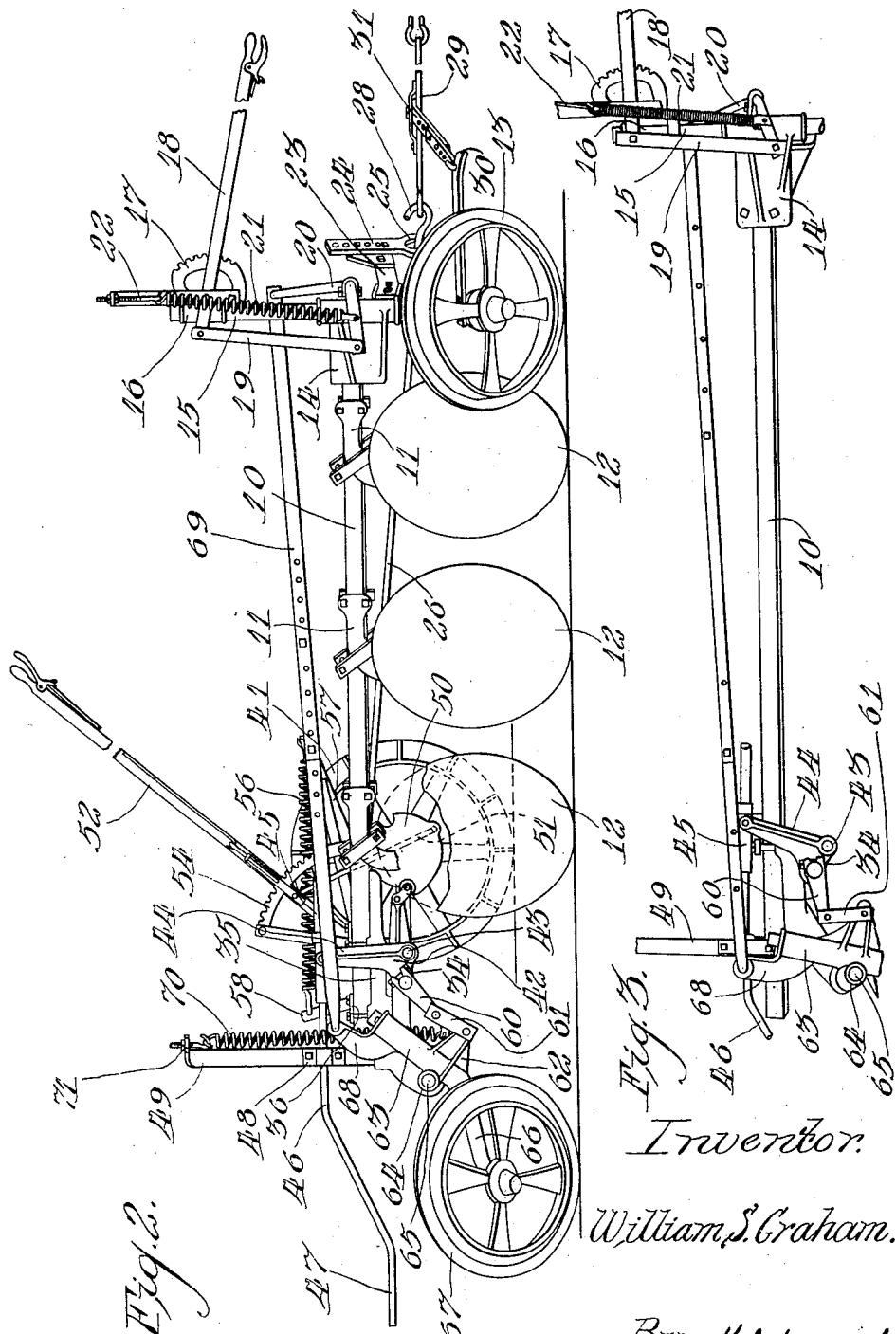

Patented Dec. 3, 1929

1,737,880

UNITED STATES PATENT OFFICE

WILLIAM S. GRAHAM, OF CANTON, ILLINOIS, ASSIGNOR TO INTERNATIONAL HARVESTER COMPANY, A CORPORATION OF NEW JERSEY

GANG PLOW

Application filed September 27, 1928. Serial No. 308,735.

This invention relates to gang plows, and more particularly to tractor disk gang plows of the convertible type.

The principal object of the invention is to improve and simplify the mechanism by which the plow frame is raised and lowered and by which adjustment of the plow for depth of cut is effected and the plow leveled. In general, the purpose is to provide a simplified and improved manner of mounting and interconnecting the adjustable supporting wheels, and particularly the land wheel and rear furrow wheel, and generally to improve the construction of the plow.

The above and other minor objects and advantages are achieved by the novel combination of parts and details of construction hereinafter more specifically described and illustrated in the accompanying drawings, where:

Figure 1 is a plan view of a disk gang plow embodying the invention;

Figure 2 is a similar side elevation viewed from the furrowward side of the plow;

Figure 3 is a detail side view of the connections between the front and rear furrow wheels;

Figure 4 is an enlarged detail view of the rear furrow wheel mounting;

Figure 5 is an enlarged detail view of the land wheel axle mounting; and

Figure 6 is the structure of Figure 5 as viewed from the left in that figure.

In the present instance, the invention has been illustrated as embodied in a gang plow having a main diagonally extending frame bar 10, preferably a square steel beam. Disk supporting brackets 11 are adjustably secured to the beam at suitable intervals and each bracket carries a plow disk 12. The forward end of the beam is supported on a front furrow wheel 13, the vertical standard of which is received in a front supporting bracket member 14 preferably consisting of a casting clamped on the front end of the beam 10. The vertical standard 15 of the furrow wheel extends above the bracket 14, as seen in Figure 2, and has secured to its upper end a sleeve 16 formed on its forward side with an arcuate rack 17. The sleeve 16 and the bracket member 14 support the adjusting mechanism for the front furrow wheel, which in this instance consists of a forwardly extending hand lever 18 pivoted on the sleeve 16 and having latch mechanism cooperating with the rack 17. The end of the lever 18, which projects back of the sleeve 16, is connected by means of a vertical link 19 with the horizontal extending arm of a bell-crank lever 20 pivoted to the front of the member 14. The other or vertical arm of the bell-crank 20 is connected to the lifting mechanism at the rear of the plow, as will be later described. Preferably a tension spring 21 is connected to the horizontal arm of the bell-crank lever 20 adjacent its connection with the link 19 and to an adjustable bolt 22 carried on the sleeve member 16. This spring assists in raising the plow.

The supporting bracket 14 also serves as the point of attachment for a rigid, laterally extending bar 23, the free end of which carries a depending bar 24 formed with an eye 25 at its lower end and connected for vertical adjustment on bar 23. The eye 25 receives the forward end of a draft link 26, which is preferably formed of overlapped sections adjustably connected together and the rear end of which is secured to a draft bracket 27 secured on the rear portion of the beam member 10. The draft bar 26 is provided with a suitable clevis 28 on its forward end for attachment of a draft bar 29. The furrow wheel 13 is provided with the usual rigid arm 30, the end of which is adjustably connected to the draft bar 29 by means of the cross link 31, as is usual in plows of this type.

The rear support for the plow consists of a cross member 35 preferably consisting of a steel casting having a seat formed intermediate its ends for reception of the beam 10, on which it is adjustably clamped, as by means of clamp plates 36. As seen in Figures 5 and 6, at its landward end the cross member 35 is formed with depending ears 37 between which there is mounted a rocking bearing block 39 on a pivot pin 38 passing through the lower ends of the ears 37.

The bearing block 39 receives the landward end of a cranked axle 40, the crank of which supports an inwardly extending spindle on which the land wheel 41 is journaled. The horizontal portion of the cranked axle 40 extends across the supporting member 35 and projects therebeyond at the furrow-ward side and is supported at that end in a bearing formed in the arm 34 of a bell-crank 42 pivoted at 43 on the end of the cross member 35.

The bell-crank 42 has a long upright arm 44 pivotally connected to an internally threaded sleeve 45 which cooperates with an adjusting screw rod 46 terminating in a crank handle 47 projecting at the rear of the plow. The screw rod 46 is held against horizontal movement in a bracket 48 carried on a vertical post 49 secured to the cross member 35. Rotation of rod 46 will, therefore, serve to move sleeve 45 and with it the arm 44 of the bell-crank 42 towards or from the post 49, thereby rocking the horizontal portion of the axle 40 in the direction of its length, by causing the furrow-ward end of that axle to be moved towards and from the under side of the cross member 35. Suitable mechanism is provided for rotating the axle 40 to effect raising and lowering of the plow and to adjust the extent of the raising and lowering action. This mechanism may consist of the usual power lift connection comprising an intermediate clutch 50 driven from the land wheel and connected by a lifting link 51 to an adjusting lever 52, which is pivotally mounted on the cross member 35 as at 53 and cooperates with the locking rack 54, also carried thereby. The usual trip mechanism controlled by a pull rope 55 controls the action of the lifting means, and the lifting may be assisted by a spring 56 connected at one end to a bracket arm 57 on the member 35, and at its other end to an arm 58 secured to the axle 40. The furrow-ward end of the axle 40 has fixed to it a crank arm 60, and this crank arm is pivotally connected, as by means of a lifting link 61, to a forwardly projecting arm 62 on a bearing bracket 63, which is pivoted at 64 to a stub shaft 65 projecting laterally from the rear end of the cross member 35. The bearing bracket 63 receives the standard 66 of the rear furrow wheel 67.

The bearing bracket 63 also has an upwardly extending arm 68, which arm is connected by a forwardly extending link 69 with the upright arm of the bell-crank lever 20 controlling the front furrow wheel. The link 69 is preferably formed of overlapped, adjustably connected sections to permit adjustment of the cross member 35 to any desired position on beam 10. A lifting spring 70 is connected at one end to the arm 62 on the bearing bracket 63 and at its other end to the upper end of post 49, as at 71. This spring assists in the lift of the furrow wheel.

With the construction described, it will be clear that operation of the lift mechanism will cause rotation of the crank axle 40 in its bearings, thereby swinging the arm 60 through a corresponding arc of movement. As this arm is connected with the rear furrow wheel bracket 63, that bracket will be caused to swing on its pivot to raise and lower the rear furrow wheel, as will be clearly understood from the illustrations in Figures 2 and 3. The pivotal movement of the rear furrow wheel bracket 63 will be communicated through link 69 to the bell-crank 20 to correspondingly raise or lower the front furrow wheel. The height to which the plow will be lowered is coarsely adjustable by means of the lever 52. For finer adjustments of the depth of cut, the screw rod 46 may be operated to rock the land wheel axle in its bearing 39, thus raising or lowering the two furrow wheels only. For leveling the plow, the lever 18 may be swung to adjust the positions of the furrow wheels.

The foregoing construction is one in which the lift mechanism and adjusting means for the plow is largely concentrated on a rear cross member which may be adjusted along the beam 10 in accordance with a number of plowing disks to be carried and in which suitable provision is made for corresponding adjustment of the connecting links between the rear cross member and the forward portion of the frame.

While a preferred embodiment of the invention has been disclosed, it will be obvious that certain modifications may be made without departure from the essential principles involved as defined in the following claims.

What is claimed as new is:

1. In a gang plow, the combination with an elongated plow carrying beam, of a rear end support therefor comprising a crosspiece secured to the beam, an axle journaled on the crosspiece and extending transversely of the beam, means for rocking the axle on the crosspiece in the direction of its length, a land wheel on one end of the axle, a furrow wheel connected to the crosspiece by vertically adjustable connecting means, and a connection between the axle and said adjustable means whereby adjustment of the furrow wheel is effected by said rocking of the axle.

2. In a gang plow, the combination with an elongated plow carrying beam, of a rear end support therefor comprising a crosspiece secured to the beam, a land wheel at one side of said beam having an axle journaled at each end in bearings on said crosspiece, means for adjusting one of said bearings in a vertical plane, a furrow wheel at the opposite side of said beam, a bearing member for the furrow wheel mounted on the crosspiece for adjustment in a vertical plane, and a pivotal connection between the furrow wheel bearing member and the adjustable bearing for the land wheel axle.

3. In a gang plow, the combination with an elongated plow carrying beam, of a rear end support therefor comprising a crosspiece secured to the beam, an axle extending across the beam and projecting beyond the crosspiece at each end, bearings on the crosspiece for each end of the axle, a land wheel on one end of said axle means for adjusting the bearing farthest from said land wheel in a vertical plane, a bearing bracket pivoted for vertical adjustment on the crosspiece adjacent said adjustable bearing, a furrow wheel supported by said bracket, and a pivoted link connection between said bracket and the adjustable bearing for the land wheel axle.

4. In a gang plow, the combination with an elongated plow carrying beam, of a rear end support therefor comprising a crosspiece secured to the beam, a transverse axle extending across the beam, a land wheel on one end thereof, a transversely rockable bearing on the crosspiece in which the land wheel end of the axle is journaled, a bell-crank pivoted on the crosspiece one arm of which is formed with a bearing in which the other end of the axle is journaled, a furrow wheel adjacent said end of the axle having a bearing bracket pivoted on a horizontal axis to the cross piece, a pivotal connection between said bracket and the axle, and means for adjusting the bell-crank on its pivot.

5. In a gang plow, the combination with an elongated plow carrying beam, of a rear end support therefor comprising a crosspiece secured to the beam, an axle extending across the beam and journaled on the crosspiece, means for rocking the axle on the crosspiece in the direction of its length, a land wheel journaled on one end of the axle, an arm fixed to the other end of the axle, means for effecting partial opposite rotations of the axle, a furrow wheel connected to the crosspiece by vertically adjustable connecting means, and a pivoted link connection between the end of said arm and said connecting means.

6. In a disk gang plow, the combination of an elongated plow carrying beam, a land wheel having an axle extending across the beam, means for mounting said axle for rocking movement in the direction of its length, a plurality of vertically adjustable furrow wheels mounted on the opposite side of the beam from the land wheel, and means for adjusting said furrow wheels by said rocking movement of the land wheel axle.

7. In a gang plow, the combination with the frame structure, of a transversely rockable bearing sleeve pivoted on the frame, a cranked axle having a horizontal portion journaled intermediate its ends in said bearing sleeve, a vertically adjustable bearing between one end of said axle and the frame, and means for rotatably adjusting the axle in said bearings.

In testimony whereof I affix my signature.

WILLIAM S. GRAHAM.